Figure 10:
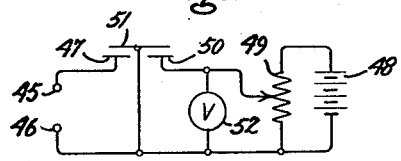

June 4, 1957  T. A. RICH  2,794,955
ELECTROMETER APPARATUS
Filed March 28, 1950  3 Sheets-Sheet 1
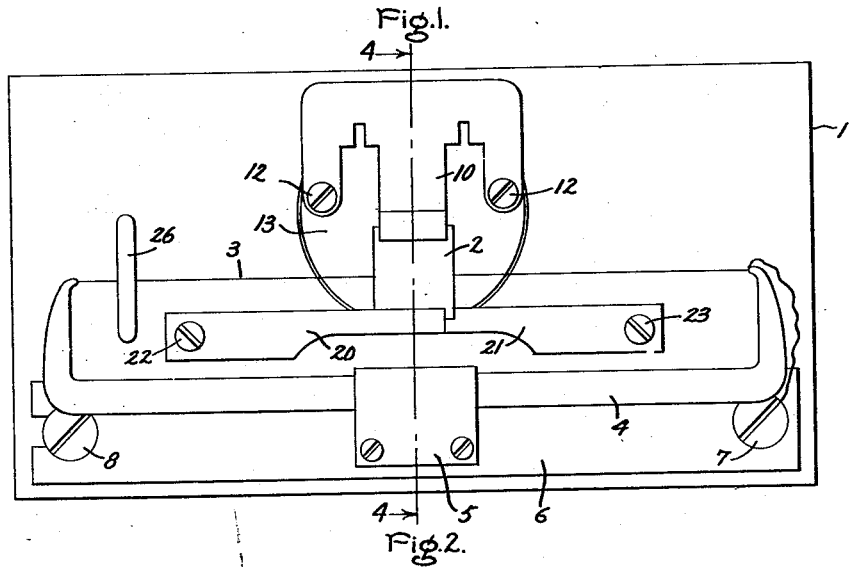
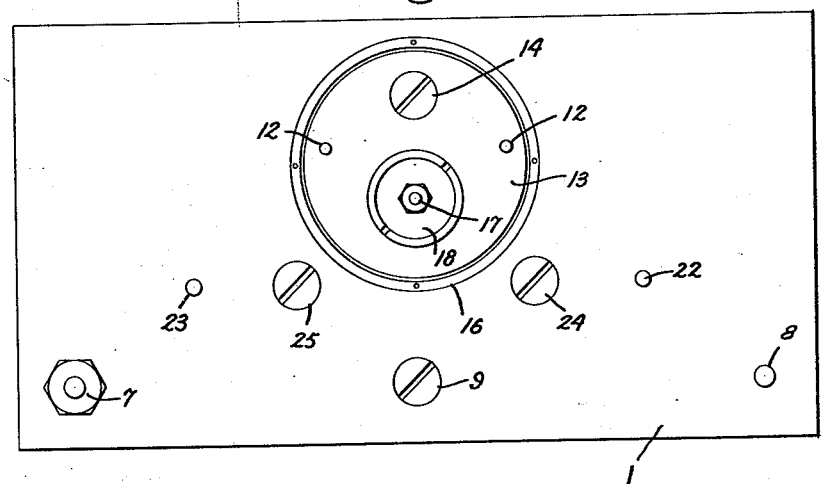
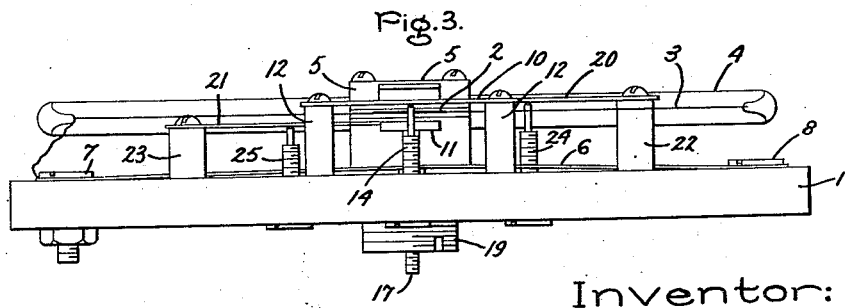
Inventor:
Theodore A. Rich,
by Paul A. Frank
His Attorney.

June 4, 1957  T. A. RICH  2,794,955
ELECTROMETER APPARATUS
Filed March 28, 1950  3 Sheets-Sheet 2
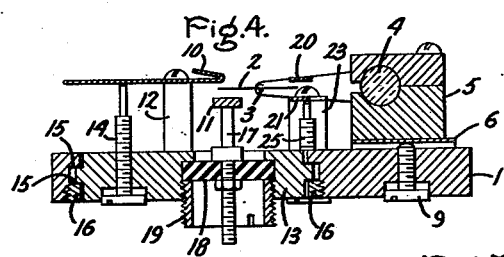
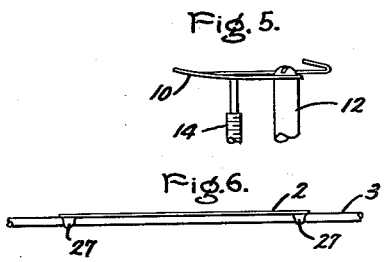
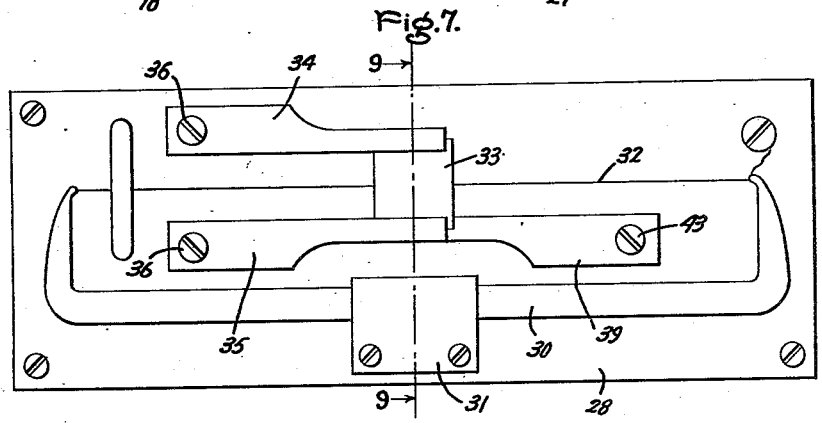
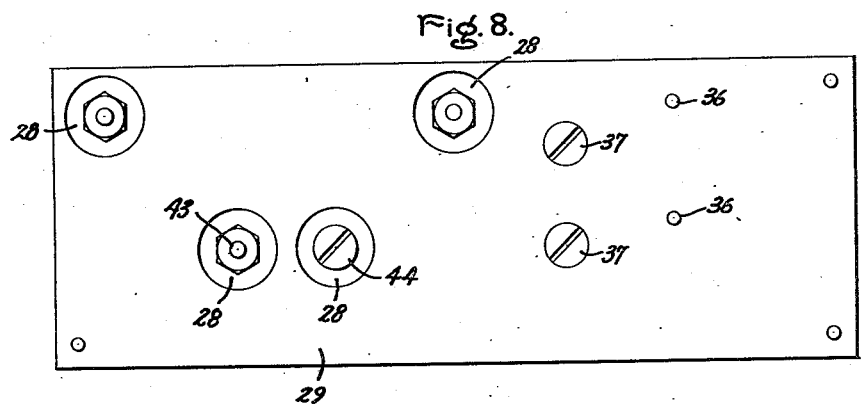
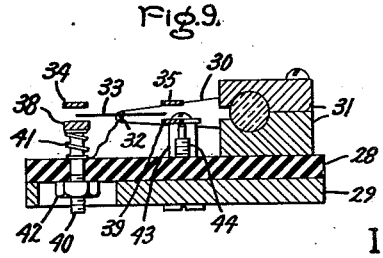
Inventor:
Theodore A. Rich,
by Paul A. Frank
His Attorney.

June 4, 1957  T. A. RICH  2,794,955
ELECTROMETER APPARATUS
Filed March 28, 1950  3 Sheets-Sheet 3

Inventor:
Theodore A. Rich,
by Paul A. Frank
His Attorney.

United States Patent Office 2,794,955
Patented June 4, 1957

2,794,955

ELECTROMETER APPARATUS

Theodore A. Rich, Schenectady, N. Y., assignor to General Electric Company, a corporation of New York Application March 28, 1950, Serial No. 152,434

6 Claims. (Cl. 324—109)

This invention relates to improvements in electrometers and circuits therefor.

Electrometer apparatus of the type herein described may be used to measure accurately direct potentials without drawing appreciable current from the source of measured potential. Such apparatus is especially useful for measuring the charge of a capacitor, where any current drawn from the capacitor would decrease the charge to be measured, and in particular for measuring the charge of pocket ionization chambers of the type widely used in radiation survey and health monitoring work.

An object of this invention is to provide improved electrometer apparatus having the characteristics of accuracy, good sensitivity, low input capacitance, fast response, reliability, ruggedness, compactness, and moderate cost. One of the features of novelty of an electrometer embodying my invention is a low inertia, light-reflecting movable vane which functions both as an electric charge-responsive element and as a light-reflecting element whereby a reading of the instrument is indicated.

This invention whereby these and other desirable features are obtained can be best understood from the illustrative embodiments hereinafter described. In general, a novel mirror electrometer construction is provided which substantially reduces the mass and inertia of moving parts; and novel circuit connections are provided in which the measured direct potential is applied to a fixed electrometer plate, rather than to the moving vane as has been common practice heretofore, and a comparison potential is applied to another fixed electrometer plate. The comparison potential may be adjustable in value, and the two fixed electrometer plates arranged so that their respective electrostatic attractive forces exerted upon the electrometer moving vane are opposed and may be brought into balance. When these forces are balanced, which is indicated with good accuracy by the position of the electrometer moving vane, a measurement of the comparison potential, which may be made with a conventional voltmeter, is an accurate measure of the unknown potential. Automatic adjustment of the comparison potential, with increased electrometer stability which permits greater sensitivity, may be obtained with a photoelectric control circuit hereinafter described.

Other objects and advantages of the invention will become apparent as the description proceeds.

Figure 12:
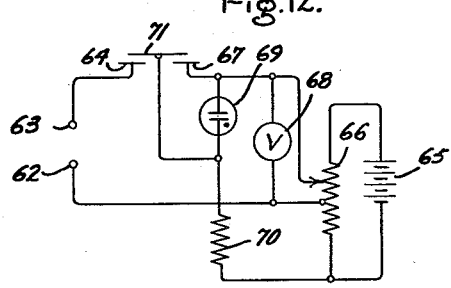
Figure 11:
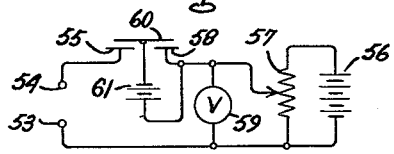
Figure 13:
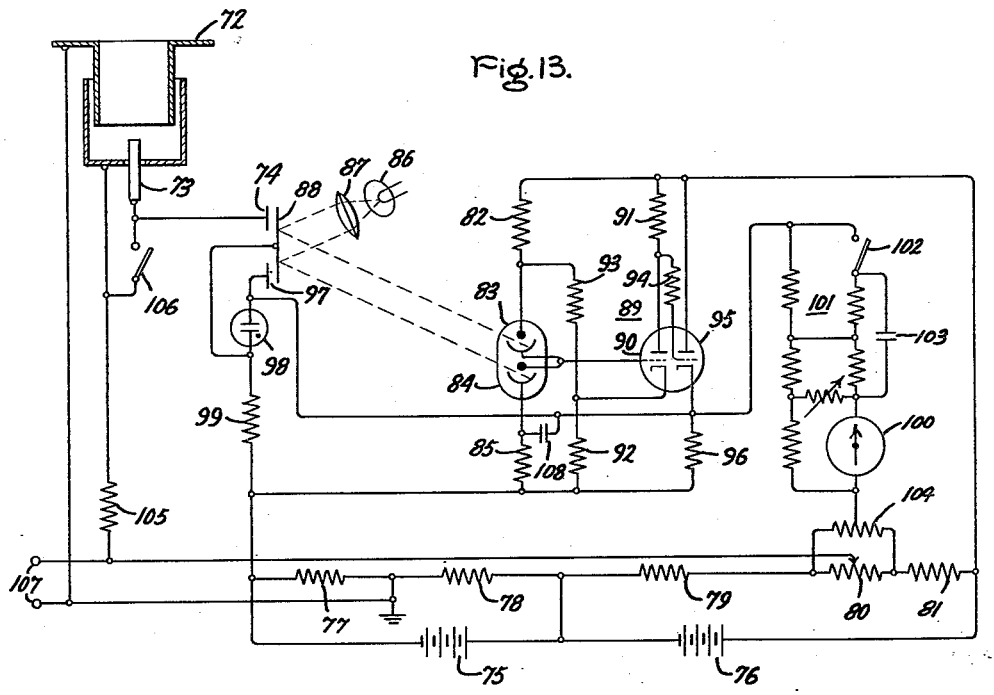

For a better understanding of the invention, reference is made in the following description to the accompanying drawings, in which Fig. 1 is an enlarged plan view of an improved mirror electrometer embodying principles of this invention; Fig. 2 is a back view of the same electrometer; Fig. 3 is an elevation of the same electrometer; Fig. 4 is a section along line 4—4, Fig. 1; Fig. 5 is a schematic view which illustrates adjustment of fixed plate 10 in this electrometer; Fig. 6 is a much enlarged view which illustrates attachment of the electrometer moving vane to its supporting filament; Fig. 7 is a plan view of another mirror electrometer embodying principles of this invention; Fig. 8 is a back view of the electrometer shown in Fig. 7; Fig. 9 is a section along line 9—9, Fig. 7; Figs. 10, 11, and 12 are circuit diagrams of improved electrometer circuits embodying principles of this invention; and Fig. 13 is a circuit diagram of a pocket chamber electrometer or "pencil reader," for measuring the charge of "pencil" type pocket ionization chambers, which includes an electrometer and photoelectric control circuit embodying principles of this invention. Where the same part appears in more than one figure of the drawings, it is represented at each appearance by the same reference numeral.

Referring now to Figs. 1 through 6, and in particular to Figs. 1, 3, and 4, the electrometer parts hereinafter described are supported upon a base 1 which is preferably made of metal or other electrically conducting material. A metal cover, not shown, may be provided to fit over this base and enclose the electrometer, thereby protecting the instrument and also shielding it from stray electric fields. The top of the cover is provided with a glass window, preferably treated to be electrically conducting, directly over the moving vane 2 of the electrometer, which also serves as the mirror, so that a light beam may pass through the window and be reflected by the moving vane, as hereafter described. The electrometer may be quite small; for example, its overall length may be about 3 or 4 inches, with other dimensions correspondingly small.

The moving vane 2 is attached to a filament 3 stretched between the ends of a bow-shaped member 4. Bow 4 is held by clamp 5 attached to the center of a flat spring 6. One end of spring 6 is held in fixed position on base 1 by a screw 7; the other end of the spring has a slot which fits under the head of a screw 8, so that this end is held against the base but may slide lengthwise along it. An adjustment screw 9, Fig. 2, passes through base 1 and presses against the lower side of spring 6 at its center, so that this screw forces the center of spring 6 upward against the spring tension. Thus, by adjusting screw 9, vane 2 and its supporting structure can be moved either up or down a small amount with respect to base 1.

On opposite sides of vane 2 are two fixed electrometer plates 10 and 11, Fig. 3. Plate 10 is a substantially flat metal sheet having a three-tined shape, as shown in Fig. 1. An outer portion of the center tine is adjacent to vane 2, and forms the electrically active portion of this plate. The outer end of this tine may be bent upward, as shown. The ends of the two outer tines are supported by pillars 12 which extend upward from an insulated mounting disc 13. An adjustment screw 14 extends upward through disc 13 and presses against an inner portion of the center tine. Adjustment of screw 14 moves the outer portion of the center tine up or down as hereafter explained.

Disc 13 is supported within a hole through block 1, and is insulated from the block by a pair of insulating washers 15, Fig. 4. These washers are held in place by flanges on block 1 and disc 13 as shown. The assembly is held together by a retaining ring 16.

Electrometer plate 11, which may be a horizontal, rectangular bar positioned below vane 2, is supported by a rod 17 which extends through an insulating bushing 18. Bushing 18 fits within a hole through disc 13, and is held in place in the hole by a retaining ring 19, as shown. It may be noted that ring 19 is electrically connected to plate 10 through disc 13 and pillars 12 and screw 14, while rod 17 is electrically connected to plate 11. When this electrometer is used in the circuits hereinafter described, the unknown potential to be measured is applied preferably to rod 17, and thus to fixed plate 11, while a comparison potential is applied to ring 19, and thus to fixed plate 10. When the measured and comparison potentials are balanced, according to the preferred mode of operating this electrometer, rod 17 and ring 19 are at the same potential, and therefore the capacitance between these members is neutralized. This makes the input capacitance of the electrometer very small.

A bias potential is applied to vane 2, as hereinafter explained. Vane 2 responds to a potential difference or voltage between the two fixed plates, since the electrostatic attractive forces acting upon the vane due to these two potentials are opposed and tend to rotate the vane in opposite directions. Rod 17 and ring 19 extend a bit beyond disc 13, as shown, to provide a suitable coupling to which a co-axial cable may be connected.

When the opposing electrostatic forces acting upon vane 2 are balanced, the vane is held in its normal or balanced position, shown in the drawings, by filament 3. When the electrostatic forces are unbalanced, vane 2 is rotated about filament 3 to a position where the torsional force of the filament balances the net torque of the electrostatic forces acting upon the vane. The position of the vane may be indicated by a light beam reflected from its surface as hereinafter explained.

To limit the movement of vane 2 and prevent oscillation, damping members 20 and 21 are provided. These damping members are positioned close to the vane on the opposite side of filament 3 from fixed plates 10 and 11. Damping of the vane is provided by air confined in the small space between it and the damping members. The damping members are supported by pillars 22 and 23, and their respective distances from moving vane 2 are adjusted by screws 24 and 25 which extend upward through base 1 and press against the under sides of the damping members, as shown.

Adjustment screws 9, 14, and 25 provide means for adjusting the respective distances between moving vane 2 and each of fixed electrometer plates 10 and 11 and damping members 20 and 21. In general, these distances are best established by experimental adjustment to get optimum operating characteristics of the electrometer: they may be in the order of 20 mils.

The construction of electrometer plate 10 permits adjustment of the distance between this plate and vane 2 while maintaining the outer portion of the center tine always parallel to the plane of its original position. This can best be understood by referring to Fig. 5. As screw 14 presses upward on the center tine, both the center tine and the outer tines bend as shown. If the position of screw 14 along the center tine is such that the center tine and the outer tines bend through equal angles, the outer portion of the center tine will remain parallel to the plane of its original position, despite movement normal to that plane under the influence of screw 14.

A feature of this electrometer is the small mass and low inertia of the moving parts, whereby a sensitive instrument having improved speed of response and ruggedness is obtained. Referring now to Figs. 1, 3, and 4, bow 4 may be a rod of quartz, glass, or other suitable material bent into the shape shown. Filament 3 is a quartz fiber stretched between the ends of the bow, and preferably is attached thereto by fusing the quartz to weld the parts together. Included in filament 3 is a closed loop of quartz fiber 26, preferably shaped as shown in Fig. 1. This loop acts as a spring, and thereby maintains the tension of the filament. Filament 3 may have a diameter in the order of 16 microns. A small wire may extend from filament 3 to screw 7, or other suitable terminal to which a bias potential may be applied. The quartz filament is made sufficiently conductive to provide the necessary electrical connection to vane 2 by a coating of evaporated platinum or other suitable metal.

Refer now to Fig. 6, which is a much enlarged view of vane 2 showing its attachment to filament 3. Moving vane 2 preferably is a very thin plate of mica, about 8 microns thick. This non-metallic plate is metallized by depositing an adherent coating of metal upon its surface. This coating, which is preferably platinum, can be painted on the surface of the mica using a platinum chloride paint of the type used in decorating china, followed by suitable heat treatment to reduce the platinum, or it can be deposited by vacuum evaporation.

The platinized mica plate 2 is held in position on platinized filament 3 by a very small quantity of silver paste 27, which is applied and then air dried. The paste is applied at only two points, one near each end of plate 2 as shown. The paste adheres to both the filament and the mica plate, thus providing a rigid attachment between vane 2 and filament 3, and is the only means by which these parts are held together. The paste is electrically conductive, and therefore also provides an electrical connection. This method of attachment causes minimum warping of the mica plate, so that vane 2 has a substantially flat, light-reflecting surface which may be used as the electrometer mirror. Thus a separate mirror is not necessary, and the mass of moving parts is reduced. Ordinary glue or cement should not be used to attach the mica to the filament, as such substances exert sufficient force on the mica while drying to warp the thin sheet substantially.

Refer now to Figs. 7, 8, and 9, which show a second form of electrometer embodying principles of this invention, but having a different arrangement of the fixed electrometer plates and damping members. The base of this instrument is constructed of insulating board 28 backed by a metal base plate 29. Bow 30 is held by clamp 31 attached directly to the base, since in this embodiment it is not necessary to make fine adjustments of the vane position. Filament 32 and moving vane 33 are constructed as in the embodiment previously described.

In this embodiment, both damping members 34 and 35 are positioned above vane 33, but on opposite sides of filament 32. The damping members are supported by pillars 36, and their position relative to vane 33 is adjustable by screws 37 which extend through the base and press against the under sides of the damping members.

Both fixed electrometer plates 38 and 39 are below vane 33, and on opposite sides of filament 32. Plate 38, which is supported by rod 40, is forced upward by spring 41 to keep nut 42, which fits upon a threaded portion of rod 40, snug against the bottom of insulating board 28. The distance between electrode 38 and vane 33 can be adjusted by turning nut 42. Electrometer plate 39 is supported by pillar 43, and its position is adjusted by screw 44 in a manner similar to adjustment of the damping members.

This embodiment has the advantage that any displacement, without turning, of mirror 33, due to sagging of filament 32 for example, does not affect the accuracy of the instrument, since such movement is the same with respect to both of the fixed electrometer plates. When this electrometer is used in the circuits hereinafter described, the unknown potential preferably is applied to plate 38, and the comparison potential is applied to plate 39.

Refer now to Fig. 10, which shows an improved circuit for electrometers of the type hereinbefore described. Terminals 45 and 46 are provided for connection to points between which potential difference or voltage is to be measured. The potential applied to terminal 46 may be ground potential, or any other reference value, and the potential applied to terminal 45 may be an unknown direct potential, the value of which with respect to the reference value is to be measured. Terminal 45 is connected to one fixed electrometer plate 47. A source of adjustable direct potential, schematically represented by the adjustable voltage source comprising battery 48 and voltage divider 49 connected as shown, is connected to the other fixed electrometer plate 50, and applies thereto a comparison potential which may be made equal to the unknown potential, as hereinafter explained. Vane 51 of the electrometer is connected to terminal 46. A conventional voltmeter 52 is connected to measure the value of the adjustable comparison potential applied to plate 50. The position of vane 51 may be indicated by a light beam, provided by a suitable source, not shown, reflected from the surface of the vane to a suitable scale, not shown.

In the operation of this circuit, the unknown direct potential is applied to terminal 45, and voltage divider 49 is adjusted to bring the electrometer moving vane 51 to its normal or balance position. At this position, the torque applied to vane 51 by the electrostatic attraction between the moving vane and fixed electrometer plate 47 is exactly equal to the torque applied by the electrostatic attraction between the moving vane and fixed electrometer plate 50. Then, the comparison potential applied to plate 50 is equal to the unknown potential applied to plate 47, or the two potentials have some known relation depending upon the design and calibration of the electrometer. The potential of plate 50 is measured by voltmeter 52, and this measurement is also a measure of the unknown potential. Current drawn by voltmeter 52 is provided by battery 48, and no current is drawn from the source of the unknown potential, except the small charging current for the capacitance between plate 47 and vane 51.

It may be noted that in this electrometer circuit, the unknown potential is connected to one of the fixed electrometer plates, instead of to the electrometer moving vane as is conventional practice. This connection reduces by almost one-half the input capacitance of the circuit as compared to electrometer circuits commonly used, and thereby reduces the amount of charging current drawn from the source of unknown potential. Also, the insulation problems in the electrometer are reduced, since the fixed plate which can be insulated much more easily than the moving vane can. Thus, better insulation can be provided, which reduces the leakage currents which tend to discharge the electrometer.

Another advantage of this circuit and the other circuits herein described, is that variations in circuit constants do not appreciably affect the accuracy of the measurement. The common heterostatic electrometer circuits require carefully balanced circuit elements. In such circuits, even moderate accuracy requirements necessitate the use of expensive, high-precision voltage dividers or equivalent balanced circuit elements, and even very small variations in the characteristics of these elements may substantially impair the accuracy of the measurement. In circuits embodying this invention, accuracy approaching that of the voltmeter used for measuring the comparison potential may be obtained with simple, relatively inexpensive apparatus.

A difficulty with the Fig. 10 circuit is that the sensitivity of the electrometer varies with the magnitude of the unknown potential measured, since the bias potential applied to moving vane 51 is the potential of terminal 46, and the potential difference between the vane and the fixed plates, upon which sensitivity depends, is equal to the unknown potential. This difficulty is overcome in the circuits which will now be described.

Referring now to Fig. 11, terminal 53 is connected to a point at ground or reference potential, and terminal 54 is connected to the point at which potential is to be measured. Terminal 54 is connected to fixed electrometer plate 55. A source of adjustable direct potential, schematically represented by battery 56 and voltage divider 57, is connected to fixed electrometer plate 58. Voltmeter 59 is connected to measure this adjustable potential. Vane 60 of the electrometer is connected through a source of bias potential, schematically represented by battery 61, to fixed plate 58. Thus the potential difference between vane 60 and fixed plate 58 is maintained at a substantially constant value, and the sensitivity of the electrometer is the same for all values of unknown potential measured. Otherwise, operation of this circuit is the same as the Fig. 10 circuit. It is noteworthy that variations in value of the bias potential affect the sensitivity only, and do not appreciably affect the accuracy of measurements made at balance. Therefore, the bias potential source need not be accurately regulated.

The best value for the bias potential depends upon the sensitivity desired and the electrometer characteristics. In general, a larger potential difference between the moving vane and the fixed electrometer plates provides greater sensitivity than a smaller potential difference. However, for each electrometer, depending upon its design, there is a critical value of this bias potential difference, beyond which the electrometer may become unstable. This is due to the fact that the electrostatic attraction between the vane and each of the fixed plates varies directly with the square of potential difference and inversely with the distance; so that, if the vane is rotated even a slight amount from its balance position, the unbalance in electrostatic forces increases and tends to produce further rotation. At potential differences lower than the critical value, the restoring torque provided by the supporting filament, which is linearly proportional to rotation of the vane, increases with vane rotation at a greater rate than the unbalance in electrostatic forces, and the electrometer is stable. At potential differences greater than the critical value, the unbalance in electrostatic forces increases at the greater rate, and the electrometer is unstable. For a particular electrometer, this critical value can easily be determined experimentally. With a photoelectric control circuit, stable operation with bias potential differences equal to or in excess of the critical value can be obtained, as hereinafter explained.

Refer now to Fig. 12, which shows a circuit identical with that shown in Fig. 11 except for the source of bias potential. Terminal 62 is connected to a point at ground or reference potential, and terminal 63 is connected to a point at the unknown potential to be measured. Terminal 63 is connected to fixed electrometer plate 64. A source of adjustable comparison potential, represented by battery 65 and voltage divider 66, is connected to fixed electrometer plate 67. The comparison potential is measured by voltmeter 68. Connected between plate 67 and the negative end of battery 65 are an electric discharge lamp, such as neon lamp 69, and a resistor 70 in series. The voltage drop across lamp 69 is substantially constant, and this voltage drop is used to provide the bias potential by connecting electrometer vane 71 to the circuit junction between lamp 69 and resistor 70. Preferably, terminal 62 is connected to an intermediate tap of resistor 66, so that the lower end of resistor 70 is substantially negative with respect to ground or reference potential. This permits measurement of small values of unknown potential or potentials of the opposite polarity.

Refer now to Fig. 13, which is a circuit diagram of a pocket chamber electrometer or "pencil reader" embodying principles of this invention. The "pencil reader" is used to measure the charge on pencil type pocket ionization chambers, which are widely used as radiation exposure meters.

The pocket ionization chamber or "pencil" is essentially an air dielectric capacitor approximately the size and shape of a pencil, which may be worn in the pocket. The plates of this capacitor are the outer shell of the "pencil" and an internal rod which is mounted within, and insulated from, this shell. In use, these "pencils" are initially charged to a standard voltage, 150 volts for example. Any radiation to which the "pencils" are exposed causes a parital discharge, so that the amount of radiation exposure can be determined at any subsequent time by reading the amount of voltage or charge remaining on the "pencil," and comparing this with the original voltage or charge.

To read the charge of a pocket ionization chamber, the "pencil" is inserted in a well comprising outer, annular member 72 and inner, rod-shaped member 73.

These members make contact with the inner and outer plates of the "pencil" capacitor, respectively. Member 72 is connected to ground, and member 73 is connected to fixed plate 74 of an electrometer.

Batteries 75 and 76 represent a conventional source of direct voltage. The total voltage across this source may conveniently be about 300 volts. Connected across the voltage source is a voltage divider comprising resistors 77, 78, 79, 80, and 81 in series. The circuit junction between resistors 77 and 78 is connected to ground, and the various resistors have values such that the potential along this divider varies from about 40 volts negative at its left-hand end to 260 volts positive at its right-hand end.

Connected across the direct voltage supply is a series circuit comprising a resistor 82, two phototube sections 83 and 84, and a resistor 85. Preferably the two phototube sections are the two halves of a twin phototube. A lamp 86 and a condensing lens 87 are positioned to direct a beam of light to the electrometer vane 88, from which the beam is reflected to phototube sections 83 and 85, so that any rotation of vane 88 changes the illumination of one phototube section relative to that of the other, and thus changes the potential at the circuit junction between the two phototube sections.

The circuit junction between the two phototube sections is connected to the input of a D.-C. amplifier 89 which comprises a triode vacuum tube section 90, plate load resistor 91, and cathode resistor 92 connected in series across the D.-C. voltage source. A resistor 93 is connected in series between resistors 82 and 92, so that resistors 82, 93, and 92 form a voltage divider which provides a fixed bias potential at the cathode of vacuum tube section 90.

The output of amplifier 89 is connected through a resistor 94 to the input of a cathode follower comprising triode vacuum tube section 95 and cathode resistor 96 connected in series across the direct voltage supply. The cathode of vacuum tube section 95 is connected to fixed plates 97 of the electrometer.

Bias potential for electrometer moving vane 88 is provided by a neon lamp 98 and a resistor 99 connected in series between electrometer plate 97 and the negative terminal of the direct voltage supply. Lamp 98 may be a ¼ watt neon lamp, and resistor 99 may have a value of about 10,000 ohms. Vane 88 is electrically connected to the circuit junction between neon lamp 98 and resistor 99. The voltage drop across lamp 98 has a substantially constant value of about 60 volts, so that a potential difference of 60 volts is maintained between the moving vane and fixed electrometer plate 97.

The circuit described comprises a photoelectric control system which not only automatically adjusts the comparison potential applied to the electrometer to the proper value to balance the unknown potential, but also contributes substantially to the stability and sensitivity of the electrometer. This may be better appreciated from the following description of the operation of the circuit.

When an unknown potential is applied to member 73, as when a charge ionization chamber is inserted in the pencil well, the resulting change in electrostatic attraction between fixed plate 74 and moving vane 88 of the electrometer tends to rotate the moving vane. This changes the relative illuminations of the two phototube sections, and hence changes the potential applied to the grid of vacuum tube section 90. A corresponding but amplified change of potential results at the cathode of vacuum tube section 95, which changes the potential of fixed electrometer plate 97. This action continues until the potential of plate 97 is substantially the same as the potential of plate 74, whereupon the electrostatic attractive forces acting on vane 88 are substantially balanced, and vane 88 comes to rest at approximately its normal or balance position.

This circuit is extraordinarily stable because any tendency of moving vane 88 to rotate from its balance position quickly produces a change in potential at electrode 97 which counteracts the tendency to rotate. Therefore, this circuit may be operated without instability at bias potential differences equal to or even several times larger than the critical value at which the electrometer would otherwise become unstable.

The electrometer approaches infinite sensitivy at the critical bias potential. Manual operation at this point, as with the circuits shown in Figs. 10–12, is difficult since a most minute change may make the electrometer unstable. Therefore, the photoelectric control circuit considerably increases the sensitivity which can be obtained with the electrometer because it makes possible stable operation substantially at the critical potential, without the risk of instability upon the occurrence of minor changes in bias potential.

The potential of plate 97 is measured by a voltmeter circuit comprising a galvanometer 100 and a resistance network 101. Switch 102 is a range-changing switch which increases the sensitivity of the voltmeter when it is closed by reducing the resistance of network 101. The ranges of the voltmeter circuit may be 0–50 and 0–10 volts, respectively. Capacitor 103 increases the speed of response of the voltmeter in the more sensitive range by delivering a pulse of current through the galvanometer wherever the voltage changes suddenly, which is just sufficient to bring the galvanometer index to the new voltage value.

The voltmeter circuit could be connected from the cathode of vacuum tube section 95 to ground, so that it would indicate the potential of electrode 97 relative to ground, and hence the actual voltage to which the pocket ionization chamber is charged. However, it is preferable to connect the voltmeter circuit as shown, between the cathode of vacuum tube section 95 and the tap of a voltage divider 104 which is connected in parallel with resistor 80. The tap of voltage divider 104 may be adjusted to a potential equal to the standard voltage to which the pocket ionization chambers are initially charged, and galvanometer 100 then indicates the amount by which the charge of the ionization chambers has decreased since they were last charged. This indication is a function of the radiation exposure of the ionization chamber, and therefore, for a particular type and size of ionization chamber, galvanometer 100 can be calibrated to read directly in terms of radiation exposure values.

It may be desired that the same "pencil reader" be used to charge the ionization chambers. This is provided for by placing an adjustable tap on resistor 80 which is connected through resistor 105 to switch 106, and when the switch is closed to member 73. Thus, when switch 106 is closed, a pocket ionization chamber in place in the pencil well is charged to the potential of the tap on resistor 80. By adjusting the position of this tap, the desired potential, 150 volts positive for example, may be obtained. Terminals 107 are provided as shown, to which a voltmeter may be attached to measure the potential at the tap of resistor 80, so that this potential can be adjusted to the desired value. The tap of resistor 104 can be properly positioned by closing switch 106 and adjusting the tap of resistor 104 until the indication of galvanometer 100 is zero.

Preferably, a capacitor 108 is provided between the upper terminal of resistor 85 and the cathode of vacuum tube section 95, as shown. Capacitor 108 provides negative feedback to the phototube circuit, and thereby increases the stability of the system. This type of feedback is described and claimed in a copending application of Theodore A. Rich and John E. Bigelow, Serial Number 89,676, filed April 26, 1949, and assigned to the same assignee as the present application.

Having described the principles of this invention in the best mode in which I have contemplated in applying those principles, I wish it to be understood that the examples given are illustrative only, and that other means can be employed without departing from the true scope of the invention.

What I claim as new and desire to secure by Letters Patent of the United States is:

1. An electrometer having an adjustable fixed plate comprising a three-tined flat metal plate having fixed supports at the ends of the outer tines with the opposite end of the plate free to move, an adjusting screw positioned to press upon an inner portion of the center tine, whereby adjustment of said screw moves the outer portion of the center tine in a direction normal to its plane while such portion remains parallel to the plane of its original position and a movable vane positioned parallel to said adjustable fixed plate at its zero deflection position.

2. An electrometer circuit comprising an electrometer of the type having a moving vane and first and second fixed electrometer plates, first and second terminals between which an unknown potential difference may be applied, said first terminal being connected to said first fixed plate, an adjustable direct voltage source connected between said second terminal and said second fixed plate, a gas ionization device and a resistor connected in series in the order named between said second fixed plate and said second terminal, said moving vane being connected to the circuit junction between said device and said resistor, and a voltmeter connected between said second fixed plate and said second terminal.

3. An electrometer circuit comprising a mirror electrometer of the type having a movable vane having a light-reflecting surface and first and second fixed electrometer plates, connections to apply an unknown potential to said first fixed plate, biasing means to apply a bias potential to said moving vane, a photoelectric control circuit connected to apply a comparison potential to said second fixed plate, and means to provide a light beam reflected from the surface of said movable vane to said photoelectric control circuit, whereby deflection of said beam by rotation of the electrometer moving vane actuates said photoelectric control circuit to change the value of the comparison potential.

4. An electrometer circuit comprising an electrometer of the type having a moving vane and first and second fixed electrometer plates, said moving vane having a light-reflecting surface, connections to apply an unknown potential to said first fixed plate, biasing means to apply a bias direct potential to said moving vane, a direct voltage supply, a series circuit including two phototube sections connected across said voltage supply, a light source positioned to direct a light beam to the moving vane of said electrometer from which the light beam is reflected to said phototube sections, so that movement of said moving vane changes the illumination of one phototube section relative to the illumination of the other and thereby changes the potential at the circuit junction between said two phototube sections, means controlled by the potential at said circuit junction to adjust automatically the potential of said second fixed plate, whereby said moving vane is kept substantially at its balance position, and means to measure the potential of said second fixed plate.

5. A pencil-reader circuit comprising a well for receiving a "pencil" type ionization chamber, said well having inner and outer members positioned to contact corresponding plates of the ionization chamber, an electrometer of the type having a moving vane and first and second fixed electrometer plates, said moving vane having a light-reflecting surface, biasing means to apply a bias direct potential to said moving vane, said first fixed plate being connected to the inner member of said well, a direct voltage supply, a series circuit including two phototube sections connected across said voltage supply, a light source positioned to direct a light beam to the moving vane of said electrometer from which the light beam is reflected to said phototube sections, so that movement of said moving vane changes the illumination of one phototube section relative to the illumination of the other and thereby changes the potential at the circuit junction between said two phototube sections, a D.-C. amplifier circuit having an input terminal connected to the circuit junction between said phototube sections and having an output terminal, a cathode follower circuit having an input terminal connected to the output terminal of said D.-C. amplifier circuit and having an output terminal connected to said second fixed electrometer plate, whereby said moving vane is kept substantially at its balance position, and a voltmeter circuit connected to measure the potential of said second fixed electrometer plate.

6. An electrometer circuit comprising an electrometer of the type having a moving vane and two fixed electrometer plates, first and second terminals between which an unknown potential difference may be applied, said first terminal being connected to one of said fixed plates to produce an electrostatic attractive force to move said vane in one direction, said second terminal being connected to a reference potential, means coupling said movable vane to said reference potential, an adjustable voltage source connected between said second terminal and the other of the said fixed plates to produce an opposing electrostatic attractive force to cause said vane to move in an opposite direction until said movement in one direction is countered, and a voltage measuring means connected across said adjustable voltage source.

References Cited in the file of this patent
UNITED STATES PATENTS

| 1,042,440 | Hubbard | Oct. 29, 1912 |
| 1,140,432 | Ames | May 25, 1915 |
| 1,177,800 | Pearson | Apr. 4, 1916 |
| 1,417,114 | Sommer | May 23, 1922 |
| 1,815,606 | Barton | July 21, 1931 |
| 1,855,669 | Glasser et al. | Apr. 26, 1932 |
| 2,136,018 | Beer | Nov. 8, 1938 |
| 2,187,541 | Goranson | Jan. 6, 1940 |
| 2,303,845 | Krasnow | Dec. 1, 1942 |
| 2,424,823 | Hathaway | July 29, 1947 |
| 2,482,801 | Rouy | Sept. 27, 1949 |
| 2,503,298 | Richardson | Apr. 11, 1950 |
| 2,550,546 | Flight | Apr. 24, 1951 |
| 2,567,276 | Dicke | Sept. 11, 1951 |
| 2,659,863 | Stanton | Nov. 17, 1953 |

FOREIGN PATENTS

| 497,728 | Great Britain | 1939 |